(12) United States Patent
Mizuno

(10) Patent No.: US 7,051,344 B2
(45) Date of Patent: May 23, 2006

(54) DISK TRAY MOVING DEVICE AND DISK RECORDING AND/OR REPRODUCING DEVICE

(75) Inventor: Hajime Mizuno, Chiba (JP)

(73) Assignee: Sony Corporation, Tokyo (JP)

( * ) Notice: Subject to any disclaimer, the term of this patent is extended or adjusted under 35 U.S.C. 154(b) by 195 days.

(21) Appl. No.: 10/181,775

(22) PCT Filed: Nov. 14, 2001

(86) PCT No.: PCT/JP01/09958

§ 371 (c)(1),
(2), (4) Date: Aug. 15, 2002

(87) PCT Pub. No.: WO02/41313

PCT Pub. Date: May 23, 2002

(65) Prior Publication Data
US 2003/0090967 A1    May 15, 2003

(30) Foreign Application Priority Data
Nov. 20, 2000    (JP)    .............................. 2000-353549

(51) Int. Cl.
    G11B 17/04    (2006.01)

(52) U.S. Cl. .................................................. 720/601

(58) Field of Classification Search ............ 369/30.94, 369/75.2; 475/149, 162; 74/462, 7 E, 422; 720/601
See application file for complete search history.

(56) References Cited

U.S. PATENT DOCUMENTS

| | | | | |
|---|---|---|---|---|
| 3,661,031 | A | * | 5/1972 | Mizukoshi et al. ........... 74/462 |
| 5,030,184 | A | * | 7/1991 | Rennerfelt .................. 475/162 |
| 5,251,499 | A | * | 10/1993 | Isozumi ....................... 74/7 E |
| 6,016,299 | A | * | 1/2000 | Ishige ........................ 369/75.2 |
| 6,023,989 | A | * | 2/2000 | Imase et al. .................. 74/422 |
| 6,418,810 | B1 | * | 7/2002 | Kerr ............................ 74/462 |
| 6,712,727 | B1 | * | 3/2004 | Kujira et al. ............... 475/149 |

FOREIGN PATENT DOCUMENTS

| | | |
|---|---|---|
| JP | 47-662 | 1/1972 |
| JP | 51-28781 | 8/1976 |
| JP | 7-240052 | 9/1995 |
| JP | 2000-76764 | 3/2000 |

OTHER PUBLICATIONS

Haguruma Binran Henshuu Iinkai ed., "Haguruma Binran" Nikkan Kogyo Shinbunsha, pp. 161-166 Nov. 30, 1962.

* cited by examiner

Primary Examiner—Tianjie Chen
(74) Attorney, Agent, or Firm—Oblon, Spivak, McClelland, Maier & Neustadt, P.C.

(57) ABSTRACT

The present invention provides a disc tray shift device including a disc tray having at least one disc placement portion, a rack having an arc portion and at least one straight portion, the rack being arranged on the disc tray, and a sun gear, a planet gear which has a large-tooth-portion engaged with the sun gear and a small-tooth-portion engaged with the rack, and a shift mechanism for shifting the disc tray between a position where the disc placement portion is withdrawn externally and a position where the disc placement portion is housed internally, wherein teeth of at least one of the sun gear, the planet gear, and the rack are profile-shifted.

11 Claims, 8 Drawing Sheets

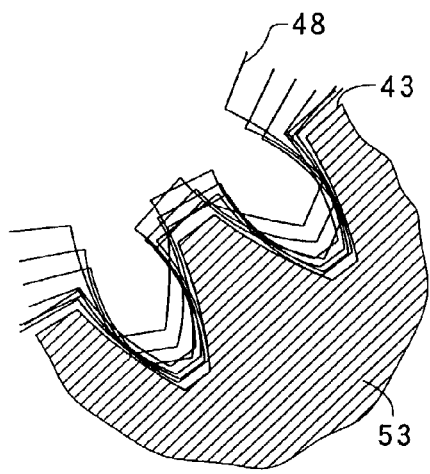
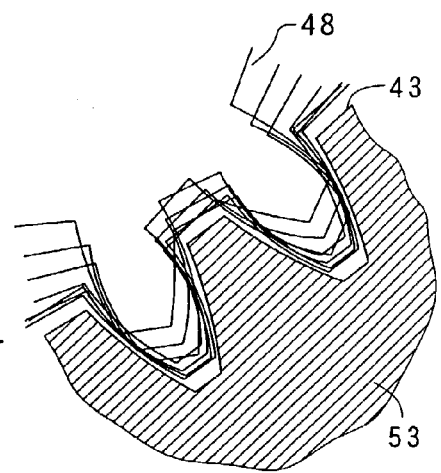
FIG. 11A　　　　FIG. 11B
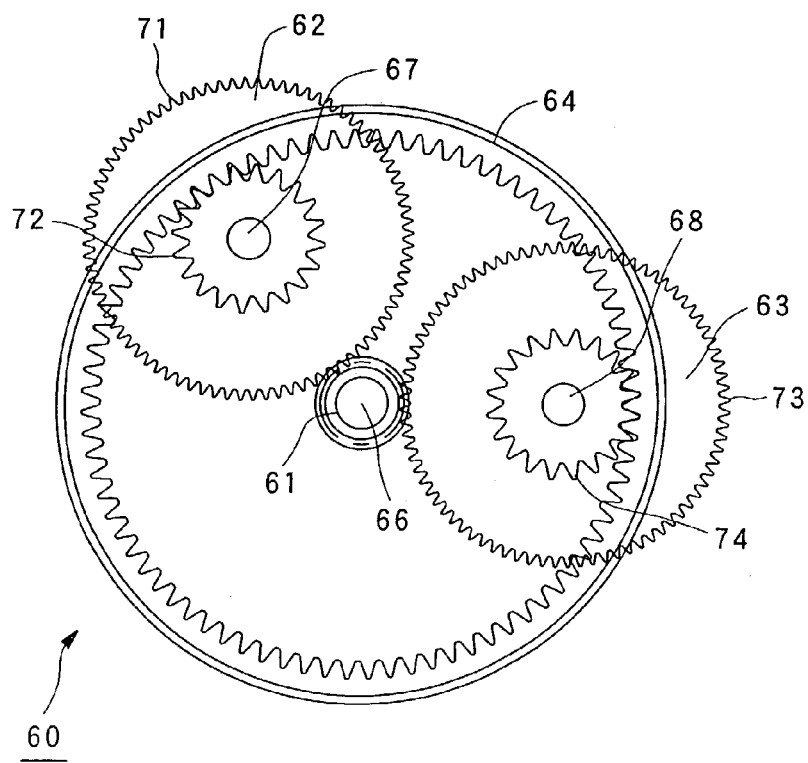
FIG. 12

US 7,051,344 B2

DISK TRAY MOVING DEVICE AND DISK RECORDING AND/OR REPRODUCING DEVICE

TECHNICAL FIELD

The present invention relates to a disc tray shift device using a gear mechanism having a sun gear and a planet gear, and disc recording and/or reproducing apparatus having the disc tray shift device.

BACKGROUND ART

Conventionally, there have been employed disc players for reproducing information recorded on read-only type optical discs, and for recording information to recording type optical discs and reproducing information recorded thereon. Such a disc player includes a disc tray onto which a plurality of optical discs are placed for loading, and a tray shift mechanism for shifting or moving the disc tray internally to and externally from the main body of the disc player.

The disc tray has the main surface which is provided with a plurality of disc placement recesses onto which a plurality of optical discs are to be placed. The disc tray is so arranged in the disc player as to be able to shift between a setting/taking-out position where an optical disc is set/taken out onto/from the disc tray and a playback position where information recorded on an optical disc is reproduced.

The tray shift mechanism includes a planetary gear mechanism for shifting the disc tray, and a drive mechanism for driving or rotating the planetary gear mechanism.

As shown in FIG. 1, a conventional planetary gear mechanism 200 of the tray shift mechanism includes a sun gear 201 which is driven or rotated by the drive mechanism, a planet gear 202 which is engaged with the sun gear 201, and an inner-tooth-rack 203 substantially of a U shape which has teeth provided on the inner side thereof and is engaged with the planet gear 202.

The sun gear 201 has a pivot shaft 205 at the center thereof, and is caused to rotate along with the pivot shaft 205 when the pivot shaft 205 is driven or rotated by a motor, not shown, of the drive mechanism.

The planet gear 202 has a pivot shaft 206 at the center thereof, and has a large-tooth-portion 207 which is engaged with the sun gear 201, and a small-tooth-portion 208 which has a pitch circle smaller than that of the large-tooth-portion 207 and is engaged with the inner-tooth-rack 203.

The inner-tooth-rack 203 is unitedly formed at around the rear end of the disc tray, and is engaged with the small-tooth-portion 208 of the planet gear 202.

The disc tray is provided with a guide ditch 211 for guiding the planet gear 202 inside and along the inner-tooth-rack 203, in which the pivot shaft 206 is movably arranged. That is, the revolution operation of the planet gear 202 is assisted by the guide ditch 211 with the small-tooth-portion 208 thereof engaged with the inner-tooth-rack 203.

In thus configured planetary gear mechanism 200, when the sun gear 201 is caused to rotate by the drive mechanism, not shown, the large-tooth-portion 207 of the planet gear 202 is rotated. When the large-tooth-portion 207 of the planet gear 202 is rotated, the small-tooth-portion 208 of the planet gear 202 is rotated along the inner-tooth-rack 203, while concurrently the planet gear 202 is caused to revolve around the sun gear 201 with the pivot shaft 205 being its revolution center.

Thus, in the planetary gear mechanism 200, when the small-tooth-portion 208 of the planet gear 202 is rotated, the inner-tooth-rack 203 is shifted, which causes the disc tray having the inner-tooth-rack 203 to shift between the setting/taking-out position and the playback position.

Generally, in a gear mechanism, in case of using gears made of resin, the distance between the centers of a pair of gears which are engaged with each other is so designed as to be slightly larger than the sum of radiuses of pitch circles of the respective gears. This is to cope with or prevent interference such as clog between respective gears due to error of negative value which may arise between centers of formed gears or expansion of gears with heat.

On the other hand, in the conventional planetary gear mechanism 200 of the tray shift mechanism, the center of an arc portion of the inner-tooth-rack 203 coincides with that of the sun gear 201, and engaged points between the respective gears are aligned on a straight line 1, as shown in FIG. 1. Thus, when it is assumed that $r_3$ is a pitch circle radius of the sun gear 201, $r_4$ is a pitch circle radius of the planet gear 202, and $\lambda$ is a predetermined gap, it is difficult to design the sun gear 201 and the planet gear 202 such that the distance between the centers of the gears is set to be $(r_3+r_4+\lambda)$ by adding the predetermined gap $\lambda$ to the sum of the $r_3$ and the $r_4$ in order to prepare gears of desired modules or desired number of teeth having appropriate gap or spacing therebetween, as shown in FIG. 2.

In preparing gears of the planetary gear mechanism 200, it is the simplest way to make the distance between the centers of the sun gear 201 and the planet gear 202 equal to the sum of the pitch circle radiuses of the respective gears in view of designing of modules or number of teeth.

However, in reality, in case the predetermined gap $\lambda$ is not secured, the problem of interference such as clog between respective gears which is caused by a slight change in condition or environment arises.

Furthermore, in the planetary gear mechanism 200, it is required that gears of sufficiently large modules be arranged in the limited space of the main body of the disc player.

DISCLOSURE OF THE INVENTION

Accordingly, the present invention has an object to overcome the above-mentioned drawbacks of the prior art by providing a disc tray shift device using a small-sized gear mechanism which can prevent interference of gear rotation of gears engaged with each other and improve operation reliability, and disc recording and/or reproducing apparatus having the disc tray shift device.

The above object can be attained by providing a disc tray shift device including a disc tray having at least one disc placement portion, a rack having an arc portion and at least one straight portion., the rack being arranged on the disc tray, and a sun gear, a planet gear which has a large-tooth-portion engaged with the sun gear and a small-tooth-portion engaged with the rack, and a shift mechanism for shifting the disc tray between a position where the disc placement portion is withdrawn externally and a position where the disc placement portion is housed internally, wherein teeth of at least one of the sun gear, the planet gear, and the rack are profile-shifted.

Also, the above object can be attained by providing a gear mechanism including a sun gear, at least one planet gear which has a small-tooth-portion, and a large-tooth-portion engaged with the sun gear, the small-tooth-portion and the large-tooth-portion being rotated unitedly, and a rack for causing the planet gear to revolve around the sun gear when the sun gear is rotated, the rack being engaged with the small-tooth-portion, wherein teeth of at least one of the sun gear, the planet gear, and the rack are profile-shifted.

Also, the above object can be attained by providing a disc recording and/or reproducing apparatus including a disc tray having at least one disc placement portion, a recording and/or reproducing unit for recording and/or reproducing information to and/or from a disc placed on the disc placement portion, a rack having an arc portion and at least one straight portion, the rack being arranged on the disc tray, and a sun gear, a planet gear which has a large-tooth-portion engaged with the sun gear and a small-tooth-portion engaged with the rack, and a shift mechanism for shifting the disc tray between a position where the disc placed on the disc placement portion is replaceable and a position where information is recorded and/or reproduced to and/or from the disc, wherein teeth of at least one of the sun gear, the planet gear, and the rack are profile-shifted.

The distance between the centers of the sun gear and the large-tooth-portion is set to be $(r_1+r_2)$, and a predetermined gap $\lambda$ is secured between pitch circles of the sun gear and the large-tooth-portion, where the $(r_1+r_2)$ is the sum of a pitch circle radius of the sun gear, a pitch circle radius of the large-tooth-portion, and the predetermined gap $\lambda$.

The pitch circle radius of the sun gear is set to be $(r_1-x\,\lambda)$, while the pitch circle radius of the large-tooth-portion is set to be $\{r_2-(1-x)\lambda\}$, where the x is a predetermined coefficient.

These objects and other objects, features and advantages of the present invention will become more apparent from the following detailed description of the preferred embodiments of the present invention.

BRIEF DESCRIPTION OF THE DRAWINGS

FIG. 11A and FIG. 11B show plan views for explaining the engagement state between a small-tooth-portion of the planet gear and the inner-tooth-rack, where FIG. 11A shows the case in which teeth thereof are not profile-shifted, while FIG. 11B shows the case in which teeth thereof are profile-shifted.

FIG. 12 shows a plan view of another example of the planetary gear mechanism according to the present invention.

BEST MODE FOR CARRYING OUT THE INVENTION

The disc player employing the present invention will further be described below concerning the best modes with reference to the accompanying drawings.

Figure 1:
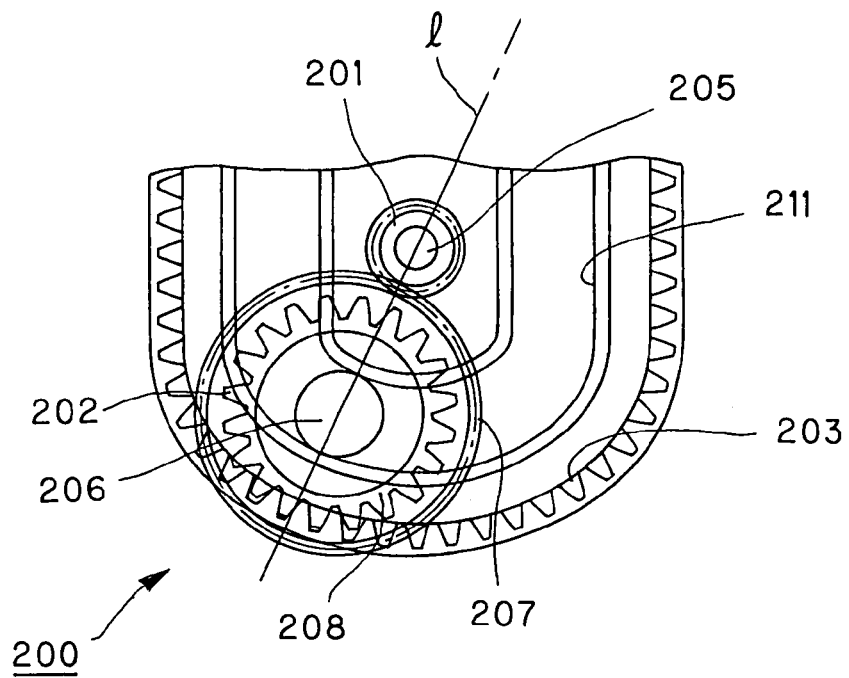
FIG. 1 shows a plan view of a conventional planetary gear mechanism.
Figure 2:
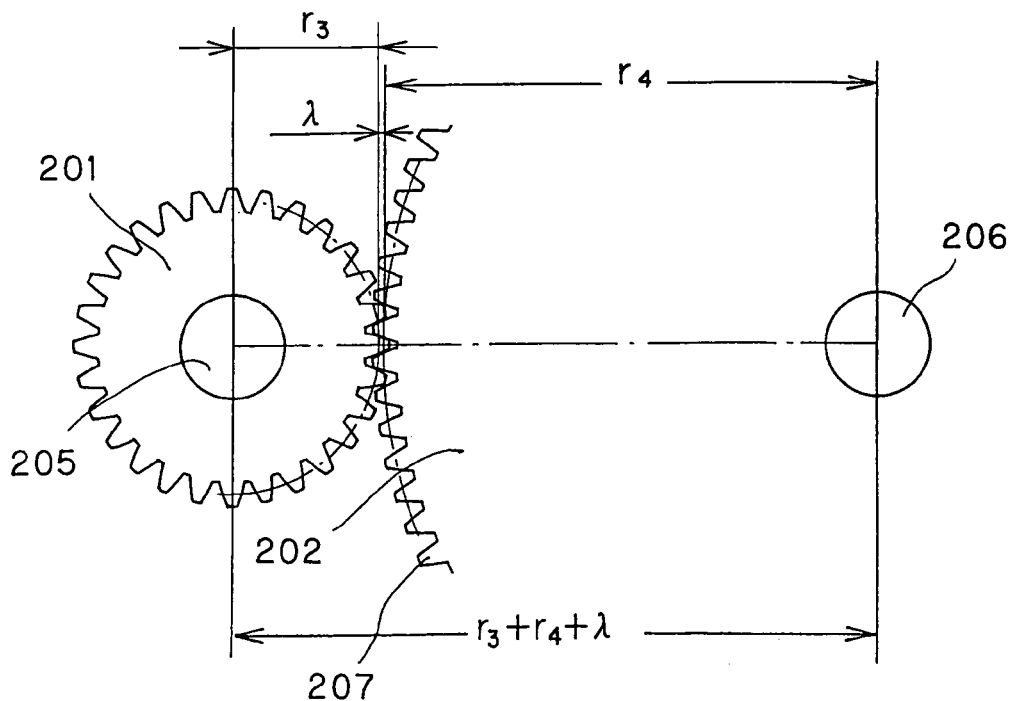
FIG. 2 shows a plan view for explaining the distance between the centers of gears of the planetary gear mechanism shown in FIG. 1.
Figure 3:
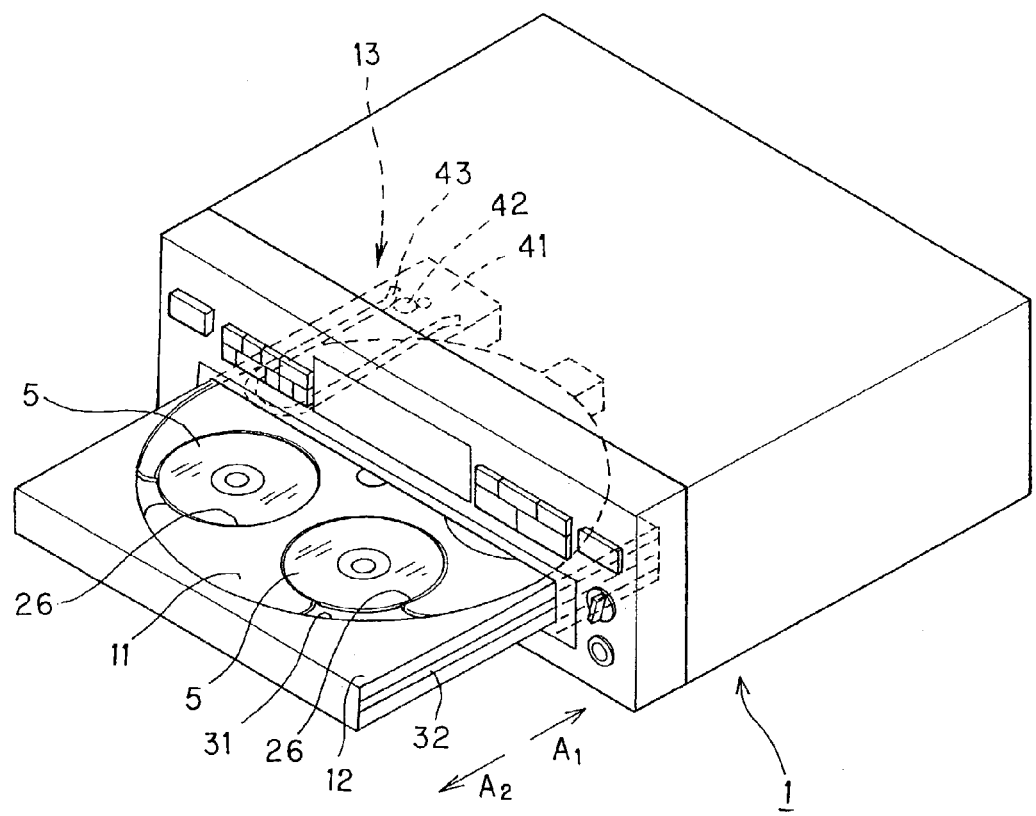
FIG. 3 shows a perspective view of a disc player according to the present invention.
Figure 4:
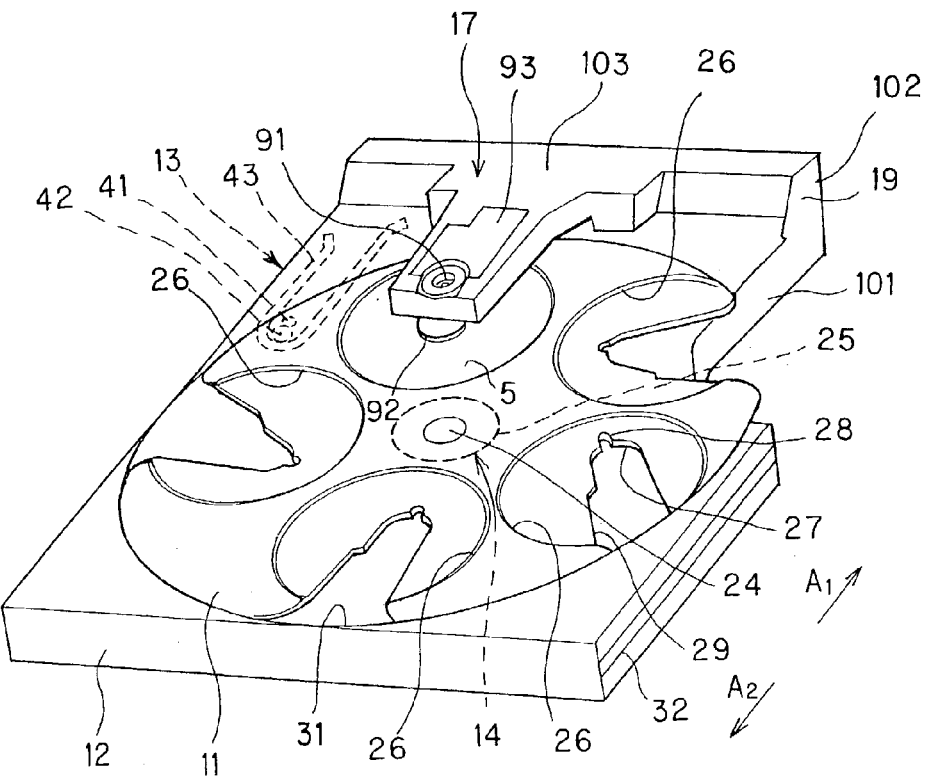
FIG. 4 shows a perspective view of a disc tray used in the disc player.

The disc player 1 according to the present invention includes a disc tray 11 onto which a plurality of optical discs 5 are to be placed, a slide tray 12 for rotatably supporting the disc tray 11, a tray shift mechanism 13 for shifting the slide tray 12 along the directions of arrows $A_1$ and $A_2$, and a tray rotation drive mechanism 14 for driving or rotating the disc tray 11, as shown in FIG. 3 and FIG. 4.

Figure 5:
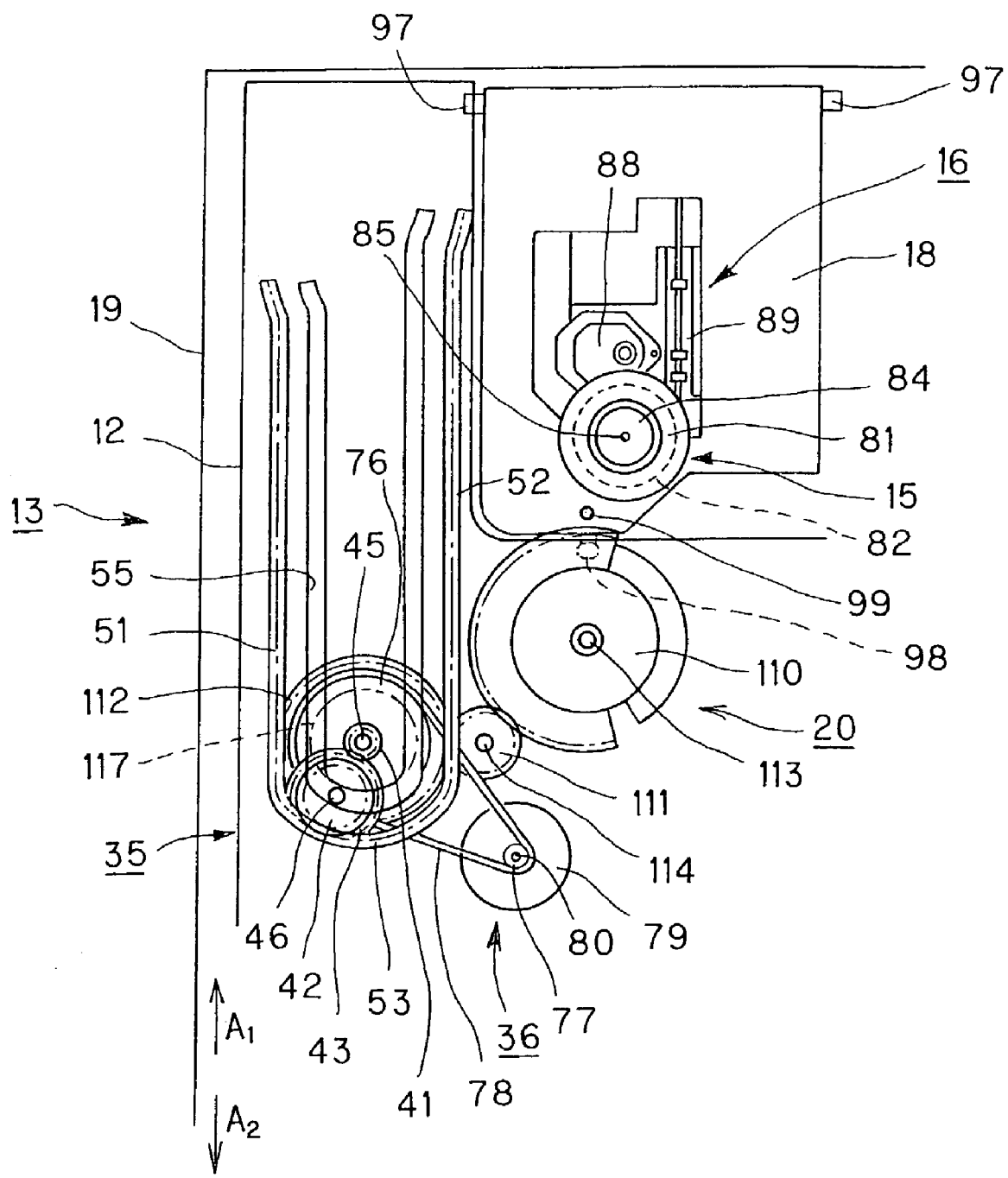
FIG. 5 shows a plan view of a tray shift mechanism for shifting the disc tray.

The disc player 1 includes a disc rotation drive mechanism 15 for driving or rotating the optical disc 5, a reproduction mechanism 16 for reproducing information recorded on the optical disc 5, a clamp mechanism 17 for rotatably clamping the optical disc 5, a support stand 18 for supporting the disc rotation drive mechanism 15 and the reproduction mechanism 16, a support base 19 for supporting the clamp mechanism 17 and the support stand 18, and a pivot mechanism 20 for causing the support stand 18 to pivot toward and away from the clamp mechanism 17, as shown in FIG. 4 and FIG. 5.

The disc tray 11 is substantially of a disc shape, and is rotatably supported by the slide tray 12 with a rotation shaft 24 being its rotation center, as shown in FIG. 4. The disc tray 11 has the main surface which is provided with a plurality of disc placement recesses 26 onto which a plurality of optical discs 5 are to be placed along the outer circumference thereof.

Each of the disc placement recesses 26 is provided with an opening 27 for causing the disc rotation drive mechanism 15 to face a center hole of the optical disc 5 to drive the optical disc 5. The opening 27 has a positioning cut 28 for positioning the disc placement recess 26 toward the disc rotation drive mechanism 15. The disc placement recess 26 has an opening 29 for causing the reproduction mechanism 16 to face the optical disc 5 to reproduce information recorded thereon, which spreads out from the opening 27 to the outer circumference of the disc tray 11.

The slide tray 12 is made of resin, and is substantially of a rectangular shape, and has a tray placement recess 31 on the main surface thereof onto which the disc tray 11 is rotatably placed, as shown in FIG. 4. The slide tray 12 has a guide member 32 at one side thereof parallel to the $A_1$ and $A_2$ directions. The slide tray 12 has the guide member 32 held by a guide rail, not shown, arranged on the support base 19, enabling the slide tray 12 to slide along the $A_1$ and $A_2$ directions.

The tray shift mechanism 13 includes a planetary gear mechanism 35 for shifting the slide tray 12 along the $A_1$ and $A_2$ directions, and a drive mechanism 36 for driving or rotating the planetary gear mechanism 35, as shown in FIG. 3, FIG. 4, and FIG. 5.

Figure 6:
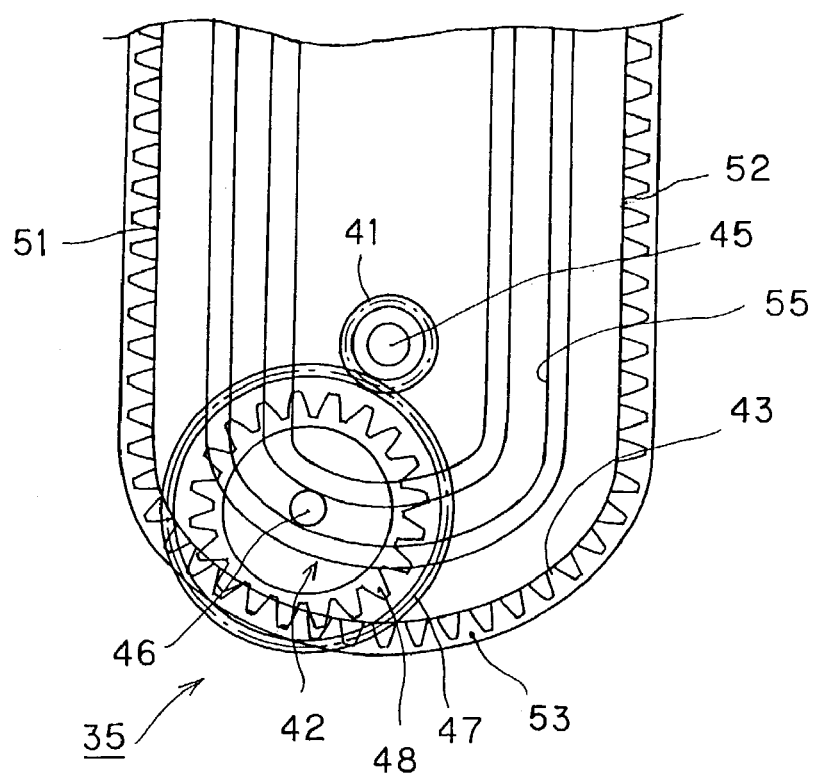
FIG. 6 shows a plan view of a sun gear, a planet gear, and an inner-tooth-rack arranged in the tray shift mechanism.

As shown in FIG. 5 and FIG. 6, the planetary gear mechanism 35 includes a sun gear 41 which is driven or rotated by the drive mechanism 36, a planet gear 42 which is engaged with and to be rotated by the sun gear 41, and an inner-tooth-rack 43 substantially of a U shape which has teeth provided on the inner side thereof and is engaged with the planet gear 42.

The sun gear 41 is made of resin, and has a pivot shaft 45 unitedly formed at the center thereof which is arranged on the support base 19, allowing the sun gear 41 to pivot with the pivot shaft 45 being its pivot center, as shown in FIG. 6.

The sun gear 41 is caused to rotate along with the pivot shaft 45 when the pivot shaft 45 is rotated by the drive mechanism 36.

The planet gear 42 is made of resin, and has a pivot shaft 46 unitedly formed at the center thereof, as shown in FIG. 6. The planet gear 42 has a large-tooth-portion 47 which is engaged with the sun gear 41, and a small-tooth-portion 48 which has a pitch circle smaller than that of the large-tooth-portion 47 and is engaged with the inner-tooth-rack 43.

The inner-tooth-rack 43 is unitedly formed at around the rear end of the slide tray 12, and has straight rail portions 51, 52 which are parallel to each other and an arc rail portion 53 whose ends are connected to respective ends of the straight rail portions 51, 52, forming a successive rail portion, as shown in FIG. 5 and FIG. 6. The straight rail portions 51, 52 of the inner-tooth-rack 43 are so formed as to be parallel to the shift direction of the slide tray 12. The straight rail portion 52 which is located at the right side is formed longer than the straight rail portion 51 which is located at the left side, and the straight rail portions 51, 52 extend toward the rear end of the slide tray 12, the straight rail portion 52 extending a little bit further than the straight rail portion 51, as shown in FIG. 5.

The slide tray 12 is provided with a guide ditch 55 for guiding the planet gear, 42 inside and along the inner-tooth-rack 43, in which the pivot shaft 46 is movably arranged. That is, the revolution operation of the planet gear 42 is assisted by the guide ditch 55 with the small-tooth-portion 48 thereof engaged with the inner-tooth-rack 43.

The planetary gear mechanism 35 of the tray shift mechanism 13 shifts the slide tray 12 so that the disc tray 11 is caused to shift between a setting/taking-out position where the optical disc 5 is set/taken out onto/from the disc tray 11 and a playback position where information recorded on the optical disc 5 is reproduced by means of the sun gear 41 and the planet gear 42.

The drive mechanism 36 of the tray shift mechanism 13 includes a large pulley 76 for rotating the sun gear 41 of the planetary gear mechanism 35, a small pulley 77 for rotating the large pulley 76, a belt 78 for transmitting drive force of the small pulley 77 to the large pulley 76 which is extended between the two pulleys, and a motor 79 for driving or rotating the small pulley 77, as shown in FIG. 5.

The large pulley 76 is fixed to the pivot shaft 45 of the sun gear 41. The motor 79 is arranged on the support base 19, and the small pulley 77 is fixed to a rotation shaft 80 of the motor 79. Thus, in the drive mechanism 36, when the motor 79 drives or rotates the small pulley 77, the sun gear 41 of the planetary gear mechanism 35 is caused to rotate by means of the small pulley 77, large pulley 76, and belt 78 being extended therebetween.

The tray rotation drive mechanism 14 is arranged on the bottom of the slide tray 12, and includes a rotation shaft 24 for rotatably holding the disc tray 11, a gear, not shown, engaged with the rotation shaft 24, and a motor 25 for driving or rotating the gear, as shown in FIG. 4. The tray rotation drive mechanism 14 drives or rotates the disc tray 11 supported by the slide tray 12 in the tray placement recess 31 to relocate a desired one of the disc placement recesses 26 to the front side of the slide tray 12, which facilitates the setting/taking-out operation for the optical disc 5 onto/from the disc tray 11. Then, the tray rotation drive mechanism 14 relocates the optical disc 5 placed on one of the disc placement recesses 21 to a position between or facing the disc rotation drive mechanism 15 and the reproduction mechanism 16.

The disc rotation drive mechanism 15 includes a disc table 81 onto which the optical disc 5 is to be placed for loading, and a spindle motor 82 for driving or rotating the disc table 81, as shown in FIG. 5. The disc table 81 is substantially of a cylindrical shape, and is made of metallic material having magnetism. The disc table 81 has a disc placement member in the shape of a flange at the outer circumference of one cylinder end thereof, onto which the optical disc 5 is to be placed. Also, at the same cylinder end, the disc table 81 has an engagement member 84 substantially of a cylindrical shape at the inner circumference thereof, which is to be engaged with a center hole of the optical disc 5. The spindle motor 82 has a spindle shaft 85 at which the disc table 81 is arranged, which penetrates the disc table 81. The end of the spindle shaft 85 protrudes from the top surface of the engagement member 84 of the disc table 81.

The reproduction mechanism 16 includes an optical pickup 88 for reproducing information recorded on the optical disc 5, and a shift mechanism 89 for causing the optical pickup 88 to shift along the radial direction of the optical disc 5, as shown in FIG. 5. The optical pickup 88 includes an optical unit which has an objective lens for causing a laser beam to focus on the recording surface of the optical disc 5, and a lens shift unit for driving or shifting the objective lens along directions parallel to and perpendicular to the optical axis thereof, respectively. The shift mechanism 89 has a support base for supporting the optical pickup 88, guide shafts for holding the support base such that the support base can shift along the radial direction of the optical disc 5, and a thread motor for causing the support base to shift, not shown.

The clamp mechanism 17 includes a clamp member 91 for rotatably clamping the optical disc 5, a clamp plate 92 in the shape of a disc which is to be abutted to the optical disc 5, and an operation arm 93 for causing the clamp member 91 to shift toward and away from the disc table 81, as shown in FIG. 5. The clamp member 91 is substantially of a cylindrical shape, and includes the clamp plate 92 at the outer circumference of one cylinder end thereof facing the disc table 81. The operation arm 93 holds the clamp member 91 at the end thereof, and has pivot shafts, not shown, at substantially the halfway portion along the longitudinal direction thereof, which are held by the support base 19, and allow the operation arm 93 to pivot upward and downward.

The support stand 18 is substantially of a rectangular block shape, and the disc rotation drive mechanism 15 and the reproduction mechanism 16 are so arranged on the main surface of the support stand 18 as to face the clamp mechanism 17, respectively, as shown in FIG. 5. The support stand 18 has pivot shafts 97, 97 at one end thereof, which are held by the support base 19 and allow the support stand 18 to pivot upward and downward. The support stand 18 has, at the same end, an operation member, not shown, for operating the operation arm 93 of the clamp mechanism 17, which is unitedly and extendedly formed toward the basal portion of the operation arm 93.

The support stand 18 has an engagement element 98 at the other end thereof, which is engaged with the pivot mechanism 20, as shown in FIG. 5. And, the support stand 18 is caused to pivot upward and downward by the pivot mechanism 20 via the engagement element 98. The support stand 18 has a positioning shaft 99 on the main surface thereof for positioning the optical disc 5 placed on each disc placement recess 26 toward the disc table 81 when the positioning shaft 99 is engaged with the positioning cut 28 of each disc placement recess 26 of the disc tray 11. Thus, the optical disc 5 placed on each disc placement recess 26 of the disc tray 11 driven or rotated by the tray rotation drive mechanism 14 is positioned toward the disc table 81.

The support base 19 is substantially of a U shape in its cross section, not shown, and has a main base 101 for slidably supporting the slide tray 12 along the $A_1$ and $A_2$ directions, a rear member 102 which holds the pivot shafts 97, 97 for allowing the support stand 18 to pivot upward and downward, and a ceiling member 103 which holds the pivot shafts for allowing the operation arm 93 to pivot upward and downward, as shown in FIG. 4 and FIG. 5. The main base 101 of the support base 19 is provided with an opening, not shown, in which the support stand 18 is so arranged as to be able to pivot upward and downward.[1]

The pivot mechanism 20 includes a cam 110 for causing the support stand 18 to pivot upward and downward, and an idler wheel 111 for rotating the cam 110, and an interlock shaft 112 arranged at the pivot shaft 45 of the sun gear 41 of the planetary gear mechanism 35, and the pivot mechanism 20 interlocks together with the tray shift mechanism 13, as shown in FIG. 5. The pivot mechanism 20 further includes a rotary encoder 117 for detecting revolution angle of the planet gear 42, which is arranged at the pivot shaft 45 of the sun gear 41. When the planet gear 42 performs the revolution operation, the rotary encoder 117 is concurrently rotated, and thus can detect the state of shift operation of the slide tray 12.

The cam 110 is so arranged on the support base 19 as to be able to pivot with a pivot shaft 113 being its pivot center, and has a cam ditch, not shown, for shifting the engagement element 98 of the support stand 18 at the outer circumference thereof. When the cam 110 is rotated, the support stand 18 is caused to pivot toward and away from the clamp member 91 of the clamp mechanism 17 by means of the engagement element 98 arranged in the cam ditch. That is, when the support stand 18 pivots upward, the optical disc 5 placed on the disc table 81 is clamped by the disc table 81 and the clamp plate 92 of the clamp member 91. Also, when the support stand 18 pivots downward, the clamp state of the optical disc 5 clamped by the disc table 81 and the clamp plate 92 of the clamp member 91 is released.

The idler wheel 111 is so arranged on the support base 19 as to be able to pivot with a pivot shaft 114 being its pivot center, and has its outer circumference caused to come into contact with the outer circumference of the cam 110.

Next, the operation of the tray shift mechanism 13 of the disc player 1 for shifting the slide tray 12 along the $A_1$ and $A_2$ directions will be explained with reference to the drawings.

In the tray shift mechanism 13, the slide tray 12 shown in FIG. 5 is housed to be located at the playback position in the disc player 1 after being shifted along the $A_1$ direction. In this state, the planet gear 42 of the planetary gear mechanism 35 is located at the left side position of the center of the arc rail portion 53 of the inner-tooth-rack 43 with the small-tooth-portion 48 thereof engaged with the inner-tooth-rack 43, as shown in FIG. 5. Also, in this state, the disc rotation drive mechanism 15 and the reproduction mechanism 16 arranged on the support stand 18 are located at a position apart from the slide tray 12.

When the small pulley 77 of the drive mechanism 36 is driven or rotated by the motor 79 clockwise, the large pulley 76 is rotated by the belt 78 which transmits drive force of the small pulley 77 to the large pulley 76, which causes the sun gear 41 to rotate clockwise, while concurrently the planet gear 42 is caused to revolve around the sun gear 41 clockwise along the arc rail portion 53 of the inner-tooth-rack 43 from a position shown in FIG. 5. Then, the planet gear 42 is shifted to the connection point of the straight rail portion 51 and the arc rail portion 53 of the inner-tooth-rack 43 to be engaged with the straight rail portion 51. After the planet gear 42 is engaged with the straight rail portion 51 of the inner-tooth-rack 43, rotation force of the planet gear 42 is transmitted to the straight rail portion 51 of the inner-tooth-rack 43 with the planet gear 42 staying at the same position, which causes the slide tray 12 to shift along the $A_2$ direction.

Figure 7:
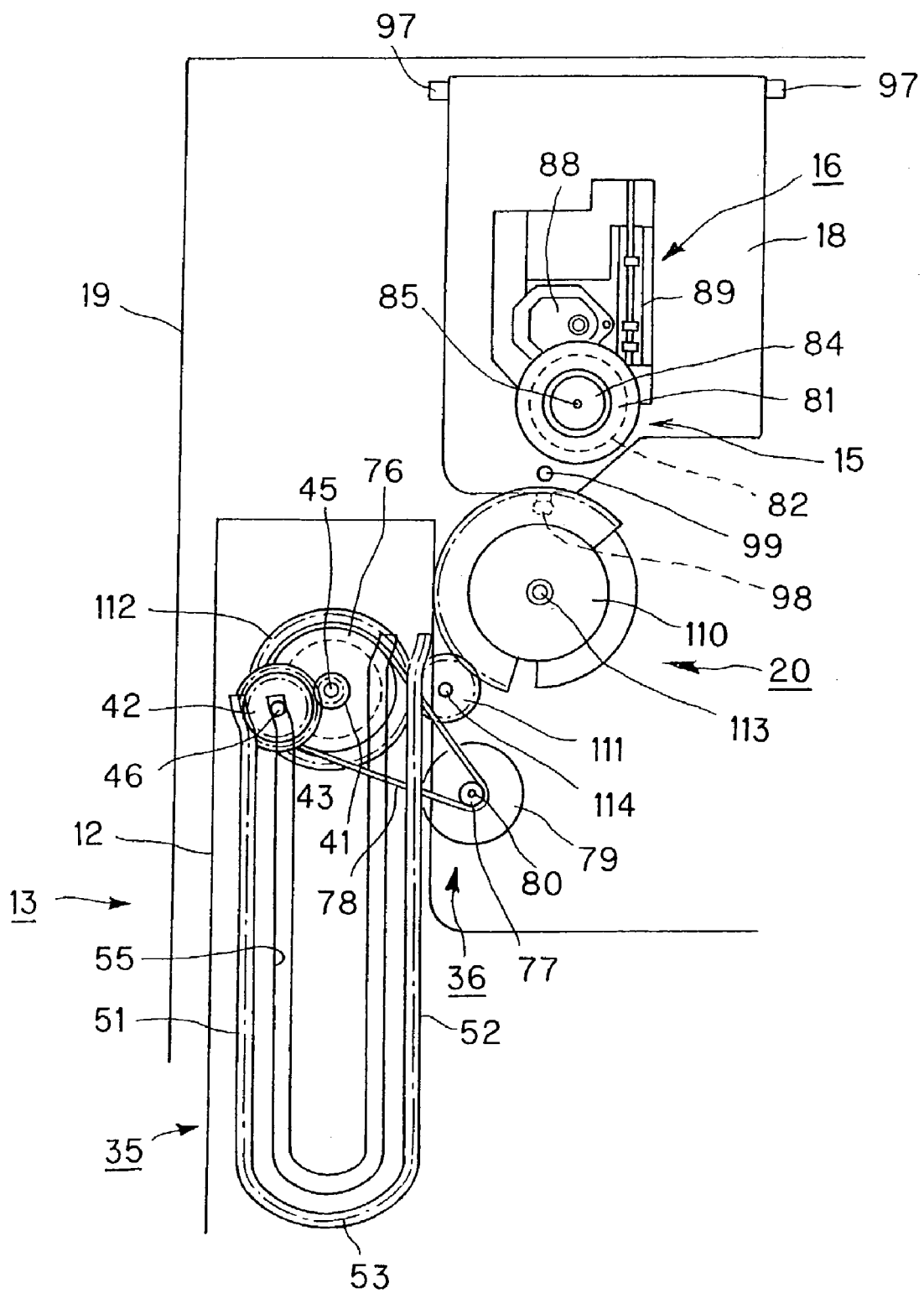
FIG. 7 shows a plan view of the tray shift mechanism, in which the slide tray is shifted along the direction of an arrow $A_2$.

Then, the end of the straight rail portion 51 of the inner-tooth-rack 43 comes to the planet gear 42, as shown in FIG. 7, and thus the slide tray 12 is withdrawn to be located at the setting/taking-out position. Thus, in this state, part of the disc placement recesses 26 of the disc tray 11 having the optical discs 5 placed thereon is withdrawn from the disc player 1, which enables the setting/taking-out operation for the optical disc 5 onto/from the disc tray 11 under rotation of the disc tray 11, as shown in FIG. 3.

When the slide tray 12 is located at the setting/taking-out position, the disc rotation drive mechanism 15 and the reproduction mechanism 16 are located at a position apart from the disc tray 11.

Next, when the small pulley 77 of the drive mechanism 36 is driven or rotated by the motor 79 counterclockwise, the slide tray 12 is caused to shift along the $A_1$ direction to be housed in the disc player 1. When the slide tray 12 is located at the playback position, the connection point of the straight rail portion 51 and the arc rail portion 53 of the inner-tooth-rack 43 comes to the planet gear 42, and the planet gear 42 is shifted from the straight rail portion 51 to the arc rail portion 53. Then, the planet gear 42 is caused to revolve around the sun gear 41 counterclockwise along the arc rail portion 53 of the inner-tooth-rack 43, as shown in FIG. 5.

When the planet gear 42 is caused to revolve counterclockwise, the interlock shaft 112 of the pivot mechanism 20 is rotated along with the revolution operation of the planet gear 42. At this time, rotation force of the interlock shaft 112 is transmitted to the cam 110 via the idler wheel 111, which caused the cam 110 to rotate.

Figure 8:
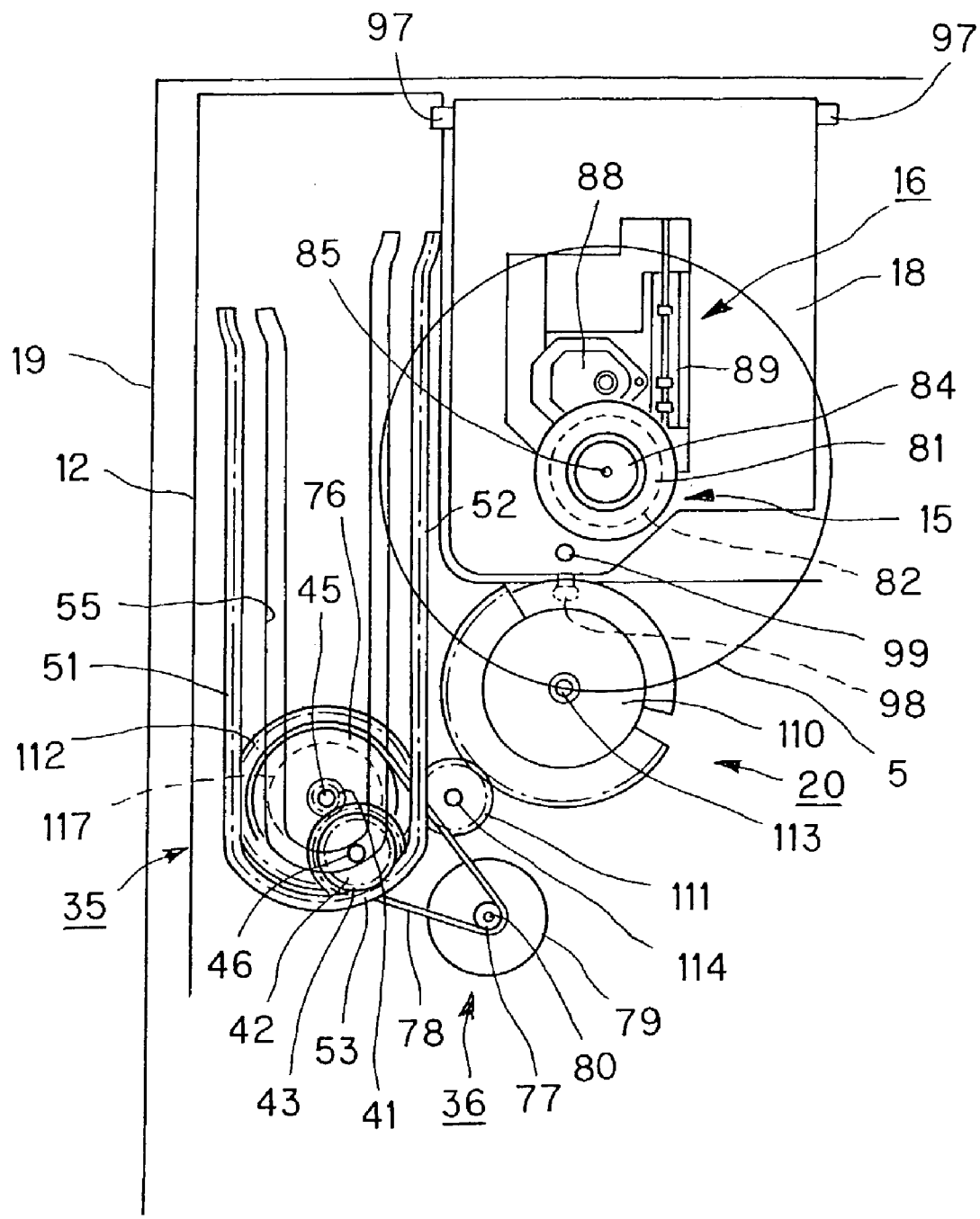
FIG. 8 shows a plan view of the tray shift mechanism, in which information is reproduced from an optical disc.

When the cam 110 of the pivot mechanism 20 is caused to rotate, the engagement element 98 of the support stand 18 is shifted along the cam ditch. And when the planet gear 42 is located at the right side position of the center of the arc rail portion 53 of the inner-tooth-rack 43, as shown in FIG. 8, the support stand 18 is caused to pivot upward with the pivot shafts 97, 97 being its pivot center. Then, the optical disc 5 is placed onto the disc table 81 of the disc rotation drive mechanism 15, and then the optical disc 5 is rotatably clamped by the disc table 81 and the clamp plate 92 of the clamp member 91, in which state information recorded on the optical disc 5 can be reproduced.

At this time, the rotary encoder 117, which is rotated along with the revolution operation of the planet gear 42, detects the shift operation state of the slide tray 12 and the clamp operation state for the optical disc 5 by the pivot mechanism 20. And when the planet gear 42 comes to a position shown in FIG. 8, drive or rotation operation of the motor 79 of the drive mechanism 36 is suspended.

Then, the optical pickup 88 of the reproduction mechanism 16 is caused to shift along the radial direction of the optical disc 5, and information recorded on the optical disc 5 can be reproduced.

Furthermore, at the time information recorded on the optical disc 5 is being reproduced, it is possible to shift the slide tray 12 to the setting/taking-out position to replace the optical discs 5 with other ones.

That is, when the small pulley 77 of the drive mechanism 36 is driven or rotated by the motor 79 counterclockwise at the time when information recorded on the optical disc 5 is being reproduced, the planet gear 42 is caused to revolve around the sun gear 41 counterclockwise along the arc rail portion 53 of the inner-tooth-rack 43 from a position shown in FIG. 8. Then, the planet gear 42 is shifted to the connection point of the straight rail portion 52 and the arc rail portion 53 of the inner-tooth-rack 43 to be engaged with the straight rail portion 52.

After the planet gear 42 is engaged with the straight rail portion 52 of the inner-tooth-rack 43, rotation force of the planet gear 42 is transmitted to the straight rail portion 52 of the inner-tooth-rack 43 with the planet gear 42 staying at the same position, which causes the slide tray 12 to shift along the $A_2$ direction.

Figure 9:
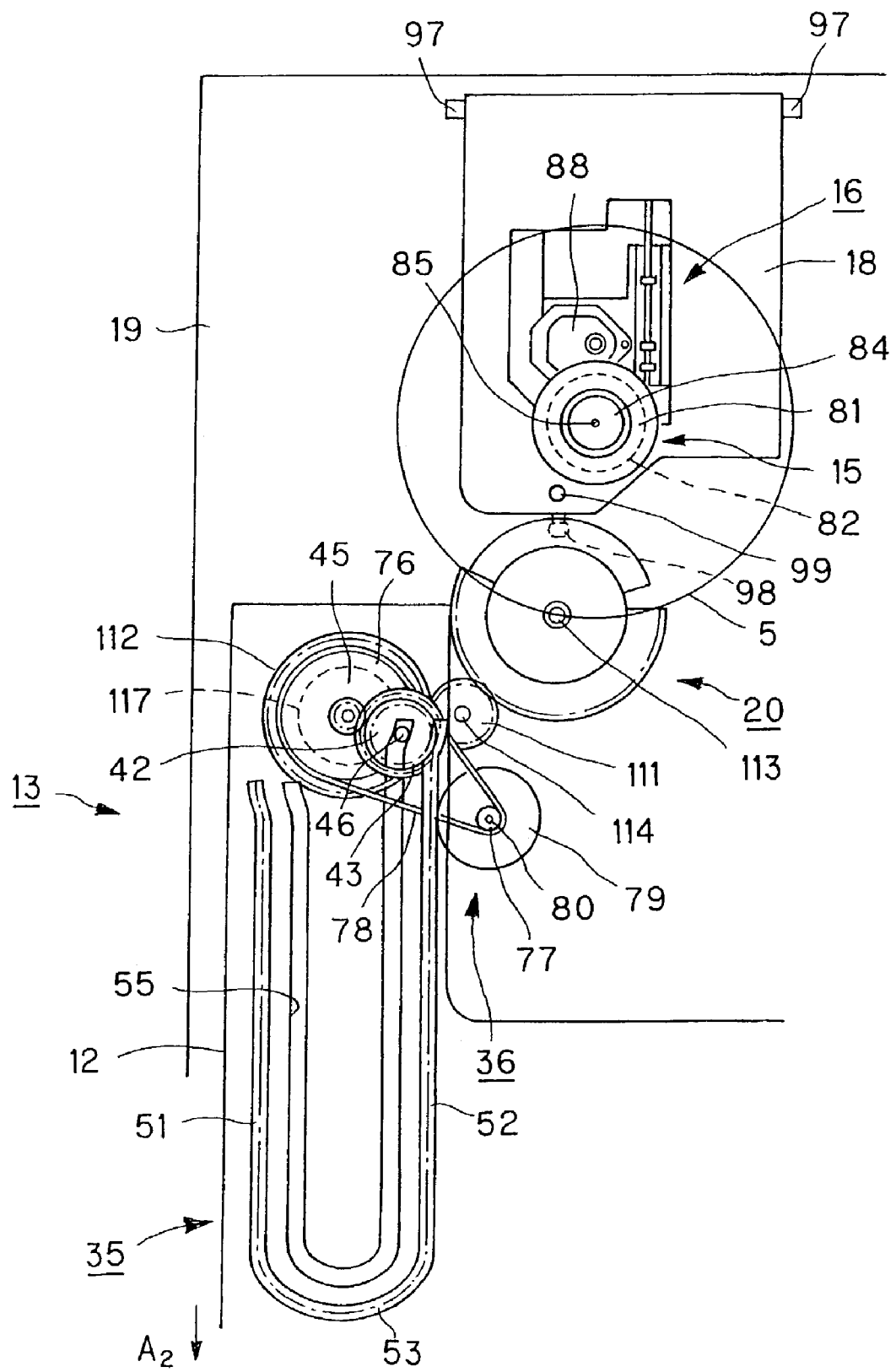
FIG. 9 shows a plan view of the tray shift mechanism, in which the slide tray is shifted along the direction of the arrow $A_2$ while playback operation for the optical disc is being performed.

Then, the end of the straight rail portion 52 of the inner-tooth-rack 43 comes to the planet gear 42, as shown in FIG. 9, and thus the slide tray 12 is withdrawn to be located at the setting/taking-out position. Thus, the disc placement recesses 26 of the disc tray 11 having the optical discs 5 placed thereon are withdrawn from the disc player 1. In this case, since the straight rail portion 52 is formed longer than the straight rail portion 51, the slide tray 12 is caused to shift along the $A_2$ direction a little bit further than the case shown in FIG. 7 in which playback operation is not being performed.

That is, the slide tray 12 is caused to shift along the $A_2$ direction a little bit further so that the playback operation of the optical disc 5 is not prevented by the disc tray 11 at the time of replacing the optical discs 5 on the disc tray 11 with other ones when the disc tray 11 on the slide tray 12 is being rotated by the tray rotation drive mechanism 14.

Figure 10:
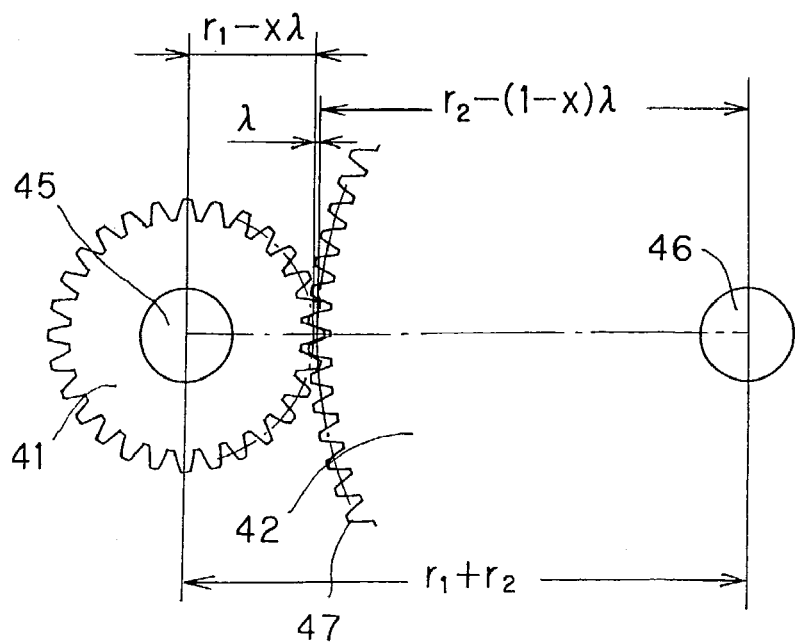
FIG. 10 shows a plan view for explaining the distance between the centers of the sun gear and the planet gear.

In the planetary gear mechanism 35 of the tray shift mechanism 13, the distance between the centers of the sun gear 41 and the large-tooth-portion 47 of the planet gear 42 is set to be $(r_1+r_2)$, and a predetermined gap $\lambda$ is secured between pitch circles of the sun gear 41 and the large-tooth-portion 47 of the planet gear 42, where the $(r_1+r_2)$ is the sum of a pitch circle radius of the sun gear 41, a pitch circle radius of the large-tooth-portion 47 of the planet gear 42, and the predetermined gap $\lambda$, as shown in FIG. 10. In the planetary gear mechanism 35, teeth of the sun gear 41 and teeth of the large-tooth-portion 47 of the planet gear 42 are negatively profile-shifted by a predetermined amount.

That is, in the planetary gear mechanism 35 in which the distance between the centers of the sun gear 41 and the large-tooth-portion 47 of the planet gear 42 is set to be $(r_1+r_2)$, in order to secure the predetermined gap $\lambda$ between pitch circles of the sun gear 41 and the large-tooth-portion 47 of the planet gear 42, the pitch circle radius of the sun gear 41 is set to be $(r_1-x\lambda)$, while the pitch circle radius of the large-tooth-portion 47 of the planet gear 42 is set to be $\{r_2-(1-x)\lambda\}$, where x is a predetermined coefficient.

In the planetary gear mechanism 35, at least either teeth of the small-tooth-portion 48 of the planet gear 42 or teeth of the inner-tooth-rack 43 are negatively profile-shifted or positively profile-shifted. The engagement state between the small-tooth-portion 48 of the planet gear 42 and the inner-tooth-rack 43 will be explained with reference to the drawings.

In case teeth of the small-tooth-portion 48 of the planet gear 42 and teeth of the inner-tooth-rack 43 are not profile-shifted, since they interfere each other and clog is prone to arise, the engagement state between them is not desirable, as shown in FIG. 11A. That is, since the number of teeth of the small-tooth-portion 48 is smaller that of the inner-tooth-rack 43, the small-tooth-portion 48 of the planet gear 42 and the inner-tooth-rack 43 interfere each other.

On the other hand, in case teeth of the small-tooth-portion 48 of the planet gear 42 and teeth of the inner-tooth-rack 43 are negatively profile-shifted by a predetermined amount, since interference of inner teeth or involute interference can be prevented, interference between respective gears can be prevented, as shown in FIG. 11B. In the embodiment, teeth of the small-tooth-portion 48 of the planet gear 42 are negatively profile-shifted, while teeth of the inner-tooth-rack 43 are positively profile-shifted.

Thus, in the planetary gear mechanism 35, since teeth of the sun gear 41 and teeth of the large-tooth-portion 47 of the planet gear 42 are profile-shifted, the engagement state between the sun gear 41 and the large-tooth-portion 47 of the planet gear 42 is improved. Thus, interference such as clog between respective gears due to error which may arise between centers of the gears or expansion of gears with heat can be prevented, which can improve operation reliability sufficiently.

In the above-described planetary gear mechanism 35 of the tray shift mechanism 13, teeth of the sun gear 41 and teeth of the large-tooth-portion 47 of the planet gear 42 are negatively profile-shifted. Furthermore, it can also be possible that teeth of the small-tooth-portion 48 of the planet gear 42 are negatively profile-shifted, while teeth of the inner-tooth-rack 43 are positively profile-shifted.

In the planetary gear mechanism 35, teeth of the sun gear 41 and teeth of the planet gear 42 are negatively profile-shifted. On the other band, teeth of a sun gear and teeth of a plurality of planet gears in another planetary gear mechanism may be profile-shifted.

For example, as shown in FIG. 12, another planetary gear mechanism 60 includes a sun gear 61, a first planet gear 62 and a second planet gear 63 which are engaged with the sun gear 61, and an inner-tooth-gear 64 which has teeth provided on the inner side thereof and is engaged with the first planet gear 62 and the second planet gear 63.

The sun gear 61 is so arranged as to be able to pivot with a pivot shaft 66 being its pivot center. The first planet gear 62 has a pivot shaft 67 at its center portion, a large-tooth-portion 71, and a small-tooth-portion 72 whose pitch circle is smaller than that of the large-tooth-portion 71, as shown in FIG. 12. Also, the second planet gear 63 has a pivot shaft 68 at its center portion, a large-tooth-portion 73, and a small-tooth-portion 74 whose pitch circle is smaller than that of the large-tooth-portion 73. The rotation center of the inner-tooth-gear 64 coincides with that of the sun gear 61.

In the planetary gear mechanism 60, teeth of the sun gear 61, teeth of the large-tooth-portions 71, 73 of the first and second planet gears 62, 63 are negatively profile-shifted. Thus, predetermined gaps are secured in the distance between the centers of the sun gear 61 and the large-tooth-portion 71 of the first planet gear 62, and in the distance between the centers of the sun gear 61 and the large-tooth-portion 73 of the second planet gear 63. Furthermore, in the planetary gear mechanism 60, it can also be possible that, in order to secure predetermined gaps in the distance between the centers of the small-tooth-portion 72 of the first planet gear 62 and the inner-tooth-gear 64, and in the distance between the centers of the small-tooth-portion 74 of the second planet gear 63 and the inner-tooth-gear 64, teeth of the small-tooth-portions 72, 74 of the first and second planet gears 62, 63 are negatively profile-shifted, while teeth of the inner-tooth-gear 64 are positively profile-shifted.

In thus configured planetary gear mechanism 60, when the sun gear 61 is driven or rotated by a motor, not show, the large-tooth-portions 71, 73 of the first and second planet gears 62, 63 are rotated. When the large-tooth-portions 71, 73 are rotated, the small-tooth-portions 72, 74 of the first and second planet gears 62, 63 are rotated, while revolving around the sun gear 61 with the pivot shaft 66 being its revolution center. Then, the inner-tooth-gear 64 is caused to rotate.

As in the above, according to the disc player 1 of the present invention, in the planetary gear mechanism 35 of the tray shift mechanism 13, teeth of the sun gear 41 and teeth of the large-tooth-portion 47 of the planet gear 42 are negatively profile-shifted. Thus, a gap between the pitch circles of the sun gear 41 and the large-tooth-portion 47 of the planet gear 42 can be secured sufficiently. So, interference such as clog between the sun gear 41 and the planet gear 42 can be prevented, thereby improving operation reliability sufficiently.

In the disc tray shift device using the tray shift mechanism 13, since teeth of the respective gears are profile-shifted, gears of sufficiently large modules can be arranged in the limited space of the main body of the disc player 1 with respective pitch circle radiuses set to be constant, thereby improving operation reliability sufficiently.

Furthermore, the present invention is not limited to the above-described disc player, and is applicable to recording and/or reproducing apparatuses using discs such as optical discs as information recording media.

INDUSTRIAL APPLICABILITY

As in the above, according to the gear mechanism of the present invention, interference between respective gears can be prevented, and thus operation reliability can be improved sufficiently. So, the disc tray shift device and the disc recording and/or reproducing apparatus having the disc tray shift device can be reduced in size.

According to the disc tray shift device using the above-described tray shift mechanism, interference between respective gears can be prevented. So, operation reliability can be improved sufficiently.

The invention claimed is:

1. A disc tray shift device comprising:
a disc tray having at least one disc placement portion;
a rack having an arc portion and at least one straight portion, the rack being arranged on the disc tray; and
a sun gear, a planet gear which has a large-tooth-portion engaged with the sun gear and a small-tooth-portion engaged with the rack, and a shift mechanism for shifting the disc tray between a position where the disc placement portion is withdrawn externally and a position where the disc placement portion is housed internally;
wherein teeth of at least one of the sun gear, the planet gear, and the rack are negatively profile-shifted.

2. The disc tray shift device as set forth in claim 1, wherein teeth of the sun gear and teeth of the large-tooth-portion are negatively profile-shifted.

3. The disc tray shift device as set forth in claim 1, wherein teeth of the small-tooth-portion are negatively profile-shifted, and teeth of the rack are positively profile-shifted.

4. A gear mechanism comprising:
a sun gear;
at least one planet gear which has a small-tooth-portion, and a large-tooth-portion engaged with the sun gear, the small-tooth-portion and the large-tooth-portion being rotated unitedly; and
a rack for causing the planet gear to revolve around the sun gear when the sun gear is rotated, the rack being engaged with the small-tooth-portion;
wherein teeth of at least one of the sun gear, the planet gear, and the rack are negatively profile-shifted.

5. The gear mechanism as set forth in claim 4, wherein teeth of the sun gear and teeth of the large-tooth-portion are negatively profile-shifted.

6. The gear mechanism as set forth in claim 4, wherein teeth of the small-tooth-portion are negatively profile-shifted, and teeth of the rack are positively profile-shifted.

7. A disc recording and/or reproducing apparatus comprising:
a disc tray having at least one disc placement portion;
a recording and/or reproducing unit for recording and/or reproducing information to and/or from a disc placed on the disc placement portion;
a rack having an arc portion and at least one straight portion, the rack being arranged on the disc tray; and
a sun gear, a planet gear which has a large-tooth-portion engaged with the sun gear and a small-tooth-portion engaged with the rack, and a shift mechanism for shifting the disc tray between a position where the disc placed on the disc placement portion is replaceable and a position where information is recorded and/or reproduced to and/or from the disc;
wherein teeth of at least one of the sun gear, the planet gear, and the rack are negatively profile-shifted.

8. The disc recording and/or reproducing apparatus as set forth in claim 7, wherein teeth of the sun gear and teeth of the large-tooth-portion are negatively profile-shifted.

9. The disc recording and/or reproducing apparatus as set forth in claim 7, wherein teeth of the small-tooth-portion are negatively profile-shifted, and teeth of the rack are positively profile-shifted.

10. The A disc recording and/or reproducing apparatus comprising:
a disc tray having at least one disc placement portion;
a recording and/or reproducing unit for recording and/or reproducing information to and/or from a disc placed on the disc placement portion;
a rack having an arc portion and at least one straight portion, the rack being arranged on the disc tray; and
a sun gear, a planet gear which has a large-tooth-portion engaged with the sun gear and a small-tooth-portion engaged with the rack, and a shift mechanism for shifting the disc tray between a position where the disc placed on the disc placement portion is replaceable and a position where information is recorded and/or reproduced to and/or from the disc;
wherein teeth of at least one of the sun gear, the planet gear, and the rack are profile-shifted, and
wherein the distance between the centers of the sun gear and the large-tooth-portion is set to be $(r_1+r_2)$, and a predetermined gap $\lambda$ is secured between pitch circles of the sun gear and the large-tooth-portion, the $(r_1+r_2)$ being the sum of a pitch circle radius of the sun gear, a pitch circle radius of the large-tooth-portion, and the predetermined gap $\lambda$.

11. The disc recording and/or reproducing apparatus as set forth in claim 10, wherein the pitch circle radius of the sun gear is set to be $(r_1-x\lambda)$, while the pitch circle radius of the large-tooth-portion is set to be $\{r_2-(1-x)\lambda\}$, the x being a predetermined coefficient.

* * * * *